Oct. 7, 1930.　　　C. M. ALEXANDER　　　1,777,869

BUBBLE CAP FOR GAS AND LIQUID CONTACT APPARATUS

Filed Jan. 18, 1927

INVENTOR
Clive M. Alexander
BY
Pennie, Davis, Marvin & Edmonds
ATTORNEYS

Patented Oct. 7, 1930

1,777,869

UNITED STATES PATENT OFFICE

CLIVE M. ALEXANDER, OF NEW ORLEANS, LOUISIANA

BUBBLE CAP FOR GAS AND LIQUID CONTACT APPARATUS

Application filed January 18, 1927. Serial No. 161,732.

This invention relates to improvements in gas and liquid or vapor and liquid contact apparatus. More particularly, the invention relates to improvements in bubble caps such as are used in fractionating towers, absorbing towers, scrubbing towers and the like where it is desired to contact a vapor or gas with a liquid. Towers for these several purposes are commonly made up of a series of pans or trays in each of which a number of nipples are arranged, caps being arranged over the nipples to compel gas or vapor rising through the nipple to bubble under the rim or through openings in the side walls of the cap through a pool of liquid maintained on the pan or tray, overflow connections also being provided to maintain a liquid level at or above the upper edges of the openings through which the gas or vapor is discharged and to permit excess liquid to flow to the next lower pan or tray in series. Various shapes of bubble caps have been employed for this purpose, some of them being supported on the rim of the cap and some by a connection between the crown of the cap and the nipple over which it is placed or the tray or pan itself, such connections, for example, a series of webs or lugs being arranged to space the bubble cap the desired distance above, and concentric with the axis of the nipple.

This invention provides an improved bubble cap of special value and application in apparatus of the type just described which has several advantages. The improved bubble cap of the invention has a high ratio between the area of the openings for the escape of gas or vapor and the space occupied by the cap, making possible a larger capacity per pan or tray of a given area. Gas and liquid or vapor and liquid contact apparatus equipped with the improved bubble caps of the invention offer exceptionally low resistance to the flow of fluids therethrough. The improved bubble cap of the invention also promotes more effective distribution of the gas or vapor escaping therefrom, making it possible to secure better contact between liquid and gas or vapor.

In the improved bubble cap of this invention, the side walls of the cap are provided with alternate extensions and indentations with respect to the mean diameter of the bubble cap and openings for the escape of gas and vapor from beneath the cap are arranged through the side walls both radially at the extremities of the extended portions and along the lateral sides thereof at an angle to the radial axis of said extended portions. The indented portions of the side wall extend inwardly approximately to the nipple over which the bubble cap is arranged so that the position of the bubble cap is maintained concentric with that of the nipple without provision of special spacing lugs or webs. A plurality of series of openings for the escape of gas or vapor from beneath the cap is thus provided, the several series of openings being arranged to discharge the gas or vapor at substantially different distances from the vertical axis of the bubble cap. A higher ratio as between the total width of the opening and the mean perimeter of the bubble cap is thus maintained, and distribution affording intimate contact is permitted by discharge of the gas or vapor at more or less separated points in a manner to insure fine division of the gas and vapor.

The present invention is particularly applicable in connection with bubble caps made by casting as it is possible to fabricate the bubble caps in this manner with a relatively large area of opening for the discharge of gas or vapor with respect to size of the cap without sacrifice of the strength of the cap or its ability to withstand handling or cooling strains involved in casting through any necessity of making parts of the cap too light.

One form of bubble cap embodying the invention is diagrammatically illustrated in the accompanying drawing, and the invention will be further described in connection therewith, but it will be understood that while the invention is exemplified by this further description and illustration it is not limited thereto.

Figure 3:
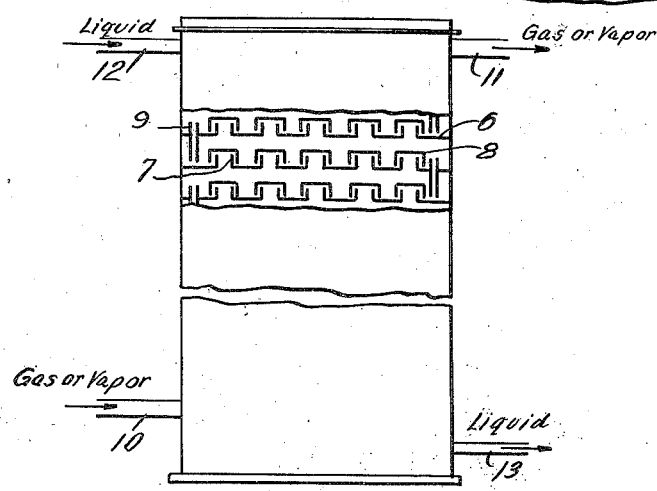
Fig. 3 is a diagrammatic representation in elevation and partly in section, of a tower illustrating the use of the improved bubble cap of the invention in apparatus of this character.

Referring to Fig. 3, the tower illustrated is of conventional construction such as is commonly used for fractionation, absorption or scrubbing operations. It consists of a series of trays 6 through which nipples 7 extend. Bubble caps 8 are arranged over the nipples so that gas or vapor rising through the nipples is compelled to bubble through liquid maintained at a level above the discharge openings of the bubble caps by means of run-back connections 9 which also serve to convey excess liquid to the next lower tray. Gas or vapor to be supplied to treatment in a tower may, for example, be introduced through connection 10 and any gas or vapor remaining uncondensed or unabsorbed may escape through connection 11. Liquid may be supplied through connection 12, and drawn off, together with any constituents absorbed or condensed from the gas or vapor, through connection 13. Employed as a fractionating tower, hot vapors may be supplied through connection 10, a condensed fraction separated in the tower and drawn off through connection 13, and the uncondensed vapors discharged through connection 11. Employed as a scrubbing or absorption tower, the scrubbing or absorbent medium may be supplied through connection 12 while the gas or vapor mixture to be treated is supplied through connection 10, the absorbent or scrubbing medium charged with absorbed constituents then being drawn off through connection 13 and the stripped gas or vapor mixture through connection 11.

Figure 1:
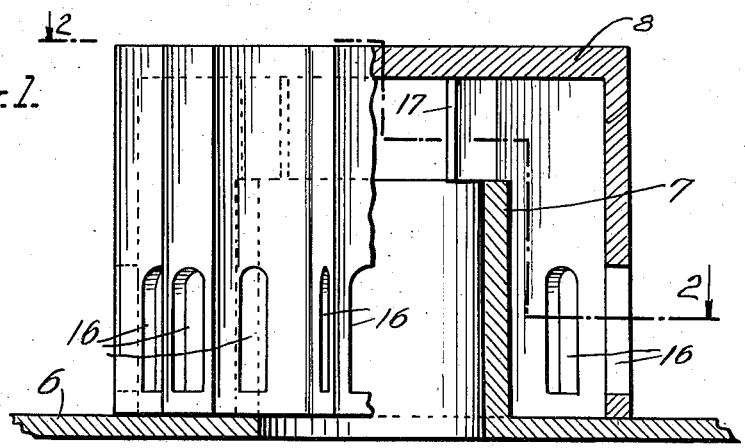
Fig. 1 is an elevation, partly in section, of a bubble cap embodying the invention.
Figure 2:
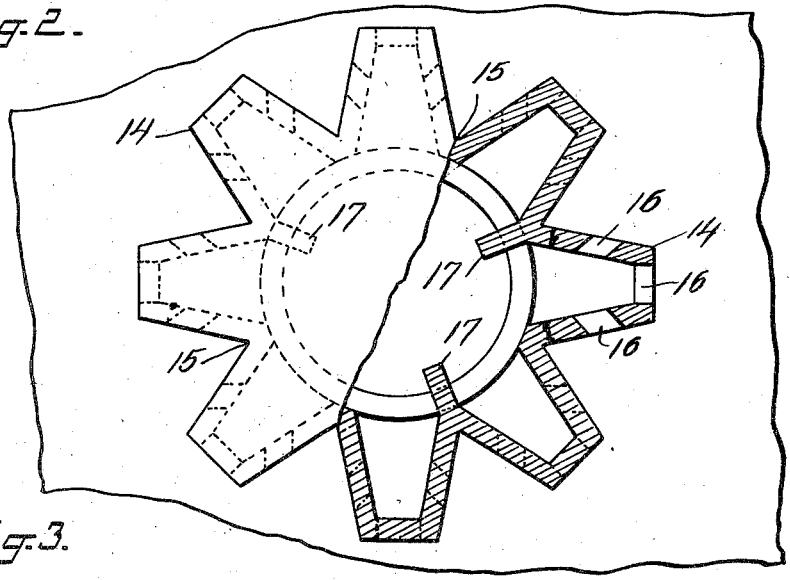
Fig. 2 is a plan view, partly in section along the line 2—2 of the bubble cap shown in Fig. 1.

The bubble cap illustrated in the drawing is of cast metal. Referring particularly to Figs. 1 and 2, the side walls are arranged to form a series of extensions 14 and indentations 15, with respect to the mean diameter of the bubble cap, extending vertically the entire height of the bubble cap. Openings 16 for the escape of gas or vapor are provided at the ends of the extensions 14 and in the lateral side walls. The adjacent openings are thus at a substantially different distance from the vertical axis of the bubble cap and gas or vapor is discharged therefrom in angularly directed streams promoting distribution and contact. A larger area of opening is provided than is possible, without sacrifice of the strength of the cap, in a bubble cap of ordinary construction with straight side walls. The indented portions of the side walls are not provided with openings for the escape of gas or vapors and extend inwardly approximately to the nipple through which the gas or vapor is introduced so that no lugs are required for centering. Lugs 17 may be provided for vertically spacing the caps the desired distance above the nipples. In the cap shown these lugs are arranged to permit the lower rim of the bubble cap to extend substantially to the tray. The caps may, however, be supported directly on their rim or by the lugs 17 with their lower rim a substantial distance above the tray.

While the bubble caps illustrated can easily be fabricated by casting, and while they are a particularly advantageous form for cast bubble caps, it will be apparent that bubble caps embodying the invention can be fabricated in other ways, likewise, that caps of various shapes, square, triangular, hexagonal or rectangular may be constructed embodying the invention.

One of the important advantages of the bubble cap of the invention is that it provides for a high ratio between the total width of opening for the discharge of gas or vapor and the mean perimeter of the bubble cap, or perimeter of a bubble cap of equal size of ordinary construction. Another important advantage of the bubble cap of the invention is that it provides for such distribution of gas or vapor issuing therefrom that any tendency to form large bubbles with consequent reduction of contact surface between gas or vapor and liquid is minimized, insuring better contact and distribution. In one aspect, the improved bubble cap of the invention can be construed as making available for contact with gas or vapor discharge from each cap an annular ring of increased radial thickness of liquid on the tray in which the edge or rim of the cap is submerged. By extending inwardly the indentations in the side walls approximately to the nipple through which gas or vapor is introduced to the bubble cap and providing openings in the lateral sides of the extensions but not in the depressions themselves, the inner diameter of the annular ring of active contacting area is decreased while at the same time the gas or vapor is not required to abruptly reverse its direction of flow so as to increase the frictional resistance to fluid flow therethrough.

I claim:

1. An improved bubble cap adapted to fit over a nipple and having side walls with alternate extensions and indentations with respect to the mean diameter of the bubble cap and openings through the ends and through the lateral sides of the extended portions, said indented portions of the side walls being adapted to space the cap concentrically with the nipple over which it is placed.

2. In gas and liquid contact apparatus the improvement comprising a nipple extending upwardly from a tray adapted to contain a liquid in combination with a bubble cap positioned over said nipple and having side walls with alternate extensions and indentations with respect to the mean diameter of the bubble cap and openings through the extended portions thereof, the indented portions of the side walls extending inwardly to the perimeter of the nipple over which the bubble cap is placed.

3. An improved bubble cap adapted to fit over a nipple and having side walls with alternate extensions and indentations with respect to the mean diameter of the bubble cap and openings therethrough at substantially different distances from the vertical axis of the cap, the indentations in the side walls extending inwardly to a series of points on the perimeter of a geometrical figure corresponding to a cross section of the nipple over which the bubble cap is to be placed.

4. An improved bubble cap adapted to fit over a nipple and having a series of openings in the side walls thereof and another series of openings projected a substantial distance beyond the first said series of openings, said side walls having indentations therein with respect to the mean diameter of the bubble cap extending inwardly to a series of points on the perimeter of a geometrical figure corresponding to a cross section of the nipple over which the bubble cap is to be placed.

5. In gas and liquid contact apparatus the improvement comprising a nipple extending upwardly from a tray adapted to contain liquid in combination with a bubble cap positioned over said nipple and having side walls with alternate extensions and indentations with respect to the mean diameter of the bubble cap, the indented portions of the side walls extending inwardly to the perimeter of the nipple over which it is placed.

6. An improved bubble cap adapted to fit over a nipple and having side walls with alternate extensions and indentations with respect to the mean diameter of the bubble cap, the indented portions of which extend inwardly approximately to the perimeter of a geometrical figure corresponding to the cross section of the nipple over which the bubble cap is to be placed, openings in the ends and lateral side walls of said extended portions, said extended portions being arranged to permit a gaseous medium to be transmitted from the crown of the bubble cap to said openings without sudden change in direction.

In testimony whereof I affix my signature.

CLIVE M. ALEXANDER.